May 3, 1955        A. V. ANDERSSON        2,707,619
PERCUSSION DRILLS
Filed June 12, 1951
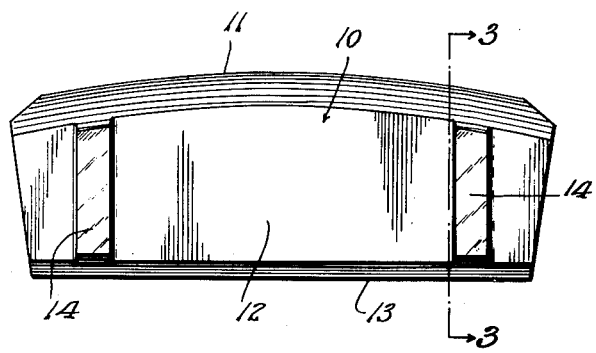
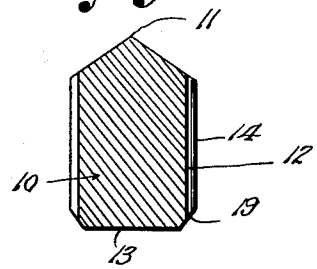
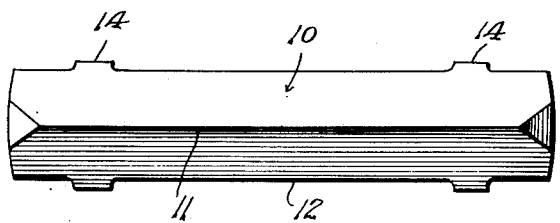
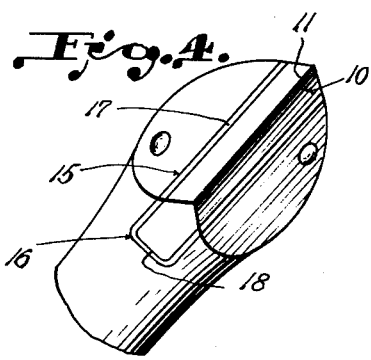
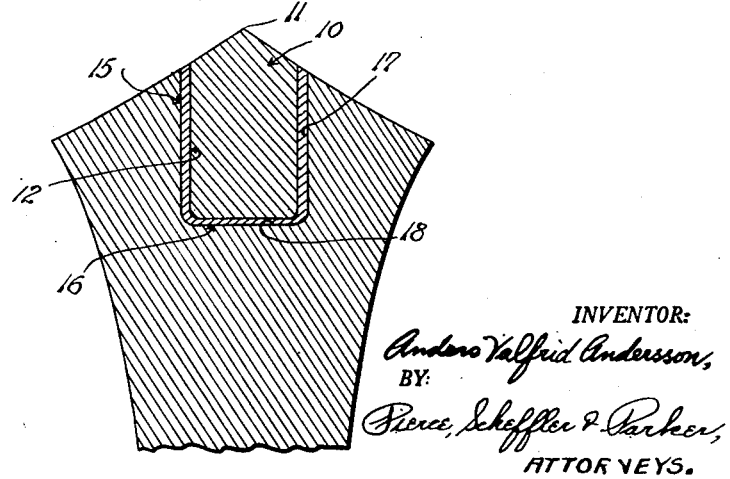
INVENTOR:
Anders Valfrid Andersson,
BY:
Pierce, Scheffler & Parker,
ATTORNEYS.

United States Patent Office 2,707,619
Patented May 3, 1955

2,707,619

PERCUSSION DRILLS

Anders Valfrid Andersson, Sandviken, Sweden, assignor to Sandvikens Jernverks Aktiebolag, Sandviken, Sweden, a corporation of Sweden Application June 12, 1951, Serial No. 231,214

Claims priority, application Sweden June 22, 1950

3 Claim. (Cl. 255—63)

The invention relates to percussion drills used in rock drilling of the type in which the drill head is provided with one or more hard metal cutting inserts fastened in a groove or channel in the drill head by brazing or soldering.

In drills of this type in order to prevent failure of the drill by cracking of the hard metal insert or working loose of the latter under the severe impact stresses to which the drill bit is subjected in service, it has proven essential to accurately dimension the thickness of the brazing metal layer between the inserted cutter blades and the walls of the groove in the drill head. In practice, it has been found that best results with a minimum of failures, either from cracking, chipping or breaking loose of the inserted cutter blade, are obtained if the cutter blades are brazed in the grooves or channels in the drill heads so as to provide a layer of brazing metal in excess of 0.2 mm. in thickness between the sides of the blades and the side walls of the grooves while maintaining the layer of brazing metal between the bottoms of the grooves and the bottoms or backs of the inserts as thin as possible.

It is of course also necessary that the inert be in axial alinement with the groove, as well as evenly and properly spaced from the side walls thereof, and for this purpose various methods of shimming have been resorted to. Such previous methods have not proven satisfactory because they necessitate the grinding of both the side walls and bottom wall of the inserts, which after the pressing and sintering operations to which they are subjected in manufacture are rather coarse and slightly converging, so as to form the side walls into parallel plane faces and the bottom into a plane face at right angles thereto. With inserts made of cemented tungsten carbide and the like very hard metals, the grinding is a very difficult and expensive operation in the manufacture of the inserts.

The primary objects of the invention are to provide a hard metal insert for drill bits of improved construction in which the necessity for grinding the entire side surfaces of the inserts is eliminated and which also obviates the use of shims and other means for centering the same in the groove in the drill bit while at the same time automatically providing the proper spacing for insuring the proper thickness of brazing metal between the sides of the insert and the walls of the groove in which the same is mounted.

The objects of the invention are achieved by forming the insert with integral spaced ribs or protuberances on the side surfaces, which ribs are ground or machined after the pressing and sintering operation, so as to form spaced lands raised above the remainder of the area of the side surfaces, and with the outer face or surface thereof on each side in parallel planes, at right angles to the bottom edge which preferably is ground to true the same with respect to the plane of the side protuberances.

The integral protuberances on the sides of the insert serve to center the same in the groove in the drill bit and are formed of such a height with respect to the side surfaces of the insert as to insure the deposit of a uniform layer of brazing metal of desired thickness on both sides of the insert between the same and the walls of the groove. The desired thin layer of brazing metal between the bottom surface of the insert and the bottom of the groove is obtained by pressing the insert into the groove while the securing metal is still in a molten state and maintaining the pressure until the brazing metal solidifies.

These and other objects and advantages of the invention are more fully disclosed in the following specification and in the accompanying drawings, in which:

Fig. 1 is a side elevation of a cutter insert embodying the invention;

Fig. 2 is a top plan view of the insert;

Fig. 3 is a section on line 3—3 of Fig. 1;

Fig. 4 is a perspective view of a drill bit with a cutter insert mounted therein in accordance with the invention, and Fig. 5 is an axial section across the cutter of a drill bit embodying the invention.

Referring now more particularly to the drawings, the cutter insert 10, according to the invention, is made of hard metal, preferably cemented tungsten carbide, formed by pressing and sintering operations into a bar or blade having a cutting edge 11, side surfaces 12 and a bottom or back surface 13. The cutter insert is formed with integral protuberances 14 upstanding from the side surfaces 12, the protuberances being spaced from each other and from the ends of the insert and preferably in the form of vertical parallel ribs, there being preferably two such ribs on each side surface, one near each end of the insert, preferably closer to the ends than to the middle of the blade.

The protuberances or ribs 14 on each side have the outer surfaces thereof ground or machined to provide flat lands lying in the same plane spaced outwardly from the main area of the side surfaces 12, a minimum distance of 0.2 mm. The outer surfaces of the ribs 14 engage the side walls 15 of a rectangular channel or groove 16 in the drill bit thereby centering the insert therein and spacing the walls 12 from the side walls 15 of the groove, it being understood that the outside dimension of the insert across the ribs is made substantially equal to that of the width of the groove 16 so as to have a reasonably close fit therein.

The insert after forming and grinding the ribs to the proper height is secured in the slot in the drill bit by brazing metal 17 which fills the space on either side of the insert and forms a bonding layer 18 between the bottom surface 13 and the bottom of the groove. The desirable thinness of the bonding layer 18 is achieved by maintaining pressure on the insert to force out excess metal from the bottom of the channel and maintaining this pressure until the bonding metal solidifies.

While it is preferred to have two rib-like protuberances on each side of the insert, it is obvious that more than two can be provided if desired, the important factor being that sufficient contact surface is provided to insure proper spacing and centering of the insert in the groove while eliminating the necessity for grinding or machining any appreciable area of the side surfaces 12.

The bottom of the channel 16 is preferably formed flat and at right angles to the sides thereof and the insert 10 is similarly formed with the flat bottom at right angles to the plane of the side ribs, except that the bottom longitudinal edges are bevelled as indicated at 19 to provide ample clearance at the corners for entry of brazing metal.

In those cases in which the bottom of the channel in the drill bit is formed with a rounded concave surface, the bottom of the insert is rounded to the same curvature and the lower ends of the side ribs are correspondingly tapered to merge with the rounded bottom to fit the shape of the slot.

It will be observed that the height of the spacing protuberances above the side surfaces of the insert determines the thickness of the bonding layer of brazing metal between the same and the sides of the groove so that by finishing the ribs of a minimum of 0.2 mm. in height, the minimum desired layer of brazing metal will be insured, while the insert is automatically centered and aligned in the groove without the use of external means.

While a preferred embodiment of the invention has been shown and described by way of illustration, it is to be understood that various changes in the size, shape and arrangement of the parts may be resorted to without departing from the spirit of the invention within the scope of the appended claims.

I claim:

1. In a percussion drill bit having a transverse channel therein, a hard metal cutting insert disposed in said channel and formed with a smooth bottom adapted to engage a smooth bottom surface of the channel and formed with side surfaces, each said side surface having at least a pair of integral spaced protuberances thereon, said protuberances on each side surface having the outer faces thereof disposed in the same plane and engaging the side walls of said channel to center the insert therein and define side clearance spaces between the sides of said insert and the respective sides of said channel, and brazing metal filling said side spaces and forming a metallic connection between the bottom of the channel and the bottom of said insert, said brazing metal forming said connection having a thickness less than the thicknesses of the brazing metal filling the side spaces, said outer faces having a total area of not more than a small fractional part of the side surfaces of the insert.

2. A percussion drill as defined in claim 1 in which the corners of said insert between said bottom and said sides are bevelled.

3. A percussion drill as defined in claim 1 wherein each side surface of said insert is provided with two protuberances, said protuberances being located nearer to the ends than to the middle of the length of said insert.

References Cited in the file of this patent

UNITED STATES PATENTS

| | | |
|---|---|---|
| 1,940,890 | Stokes | Dec. 26, 1933 |
| 2,101,376 | Voigtlander | Dec. 7, 1937 |
| 2,354,144 | Ross | July 18, 1944 |
| 2,614,813 | Shepherd | Oct. 21, 1952 |
| 2,617,631 | Shepherd | Nov. 11, 1952 |
| 2,628,072 | Baker | Feb. 10, 1953 |
| 2,633,335 | Hart | Mar. 31, 1953 |

FOREIGN PATENTS

| | | |
|---|---|---|
| 372,252 | Great Britain | May 5, 1932 |